United States Patent [19]
Saiki et al.

[11] Patent Number: 5,388,087
[45] Date of Patent: Feb. 7, 1995

[54] RECORDING AND REPRODUCING APPARATUS INCLUDING CHANGING A REPRODUCTION CHARACTERISTIC WHEN AN ERROR HAS OCCURRED IN REPRODUCED DATA

[75] Inventors: Eisaku Saiki, Yokohama; Takuya Mizokami, Odawara; Naoto Matsunami, Fujisawa, all of Japan

[73] Assignee: Hitachi, Ltd., Tokyo, Japan

[21] Appl. No.: 912,504

[22] Filed: Jul. 13, 1992

[30] Foreign Application Priority Data

Jul. 11, 1991 [JP] Japan ................... 3-196084

[51] Int. Cl.6 ............................. G11B 7/00
[52] U.S. Cl. ........................ 369/48; 369/50; 369/54; 369/124
[58] Field of Search ............... 369/32, 44.25–44.27, 369/44.29, 44.31–44.36, 44.39, 47–50, 54, 58, 124; 360/31, 53, 73.03, 77.02–77.03

[56] References Cited

U.S. PATENT DOCUMENTS 5,164,932 11/1992 Fennema et al. ............ 369/44.29
5,233,584 8/1993 Kulakowski et al. ......... 369/50 X

*Primary Examiner*—W. R. Young
*Attorney, Agent, or Firm*—Antonelli, Terry, Stout & Kraus

[57] ABSTRACT

A recording and reproducing apparatus is provided with a recording circuit to record information on a recording medium rotated and a reproducing circuit to reproduce the information from the recording medium rotated. In the mode of reproducing the information from the recording medium, the reproducing circuit retries reproduction if any error has occurred to the data reproduced. The reproducing circuit is provided with a characteristic changing circuit to change its reproduction characteristic. In the mode of reproducing information from the recording medium, the reproducing characteristic of the reproducing circuit is changed by the characteristic changing circuit if any error has occurred to the reproduced data. The reproducing circuit uses the changed reproducing characteristic to retry the reproduction.

11 Claims, 17 Drawing Sheets

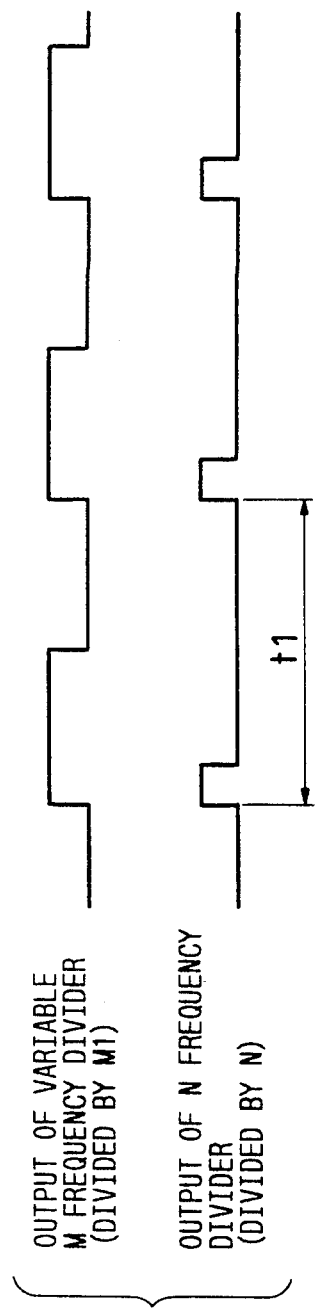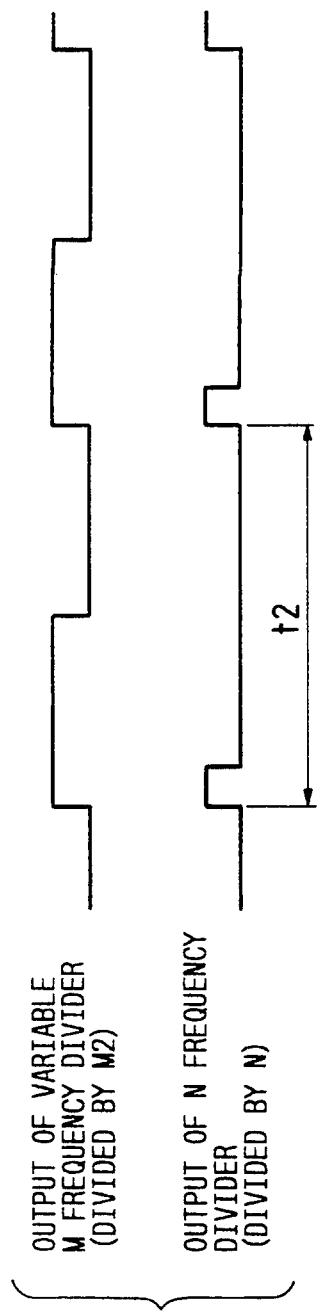

RECORDING AND REPRODUCING APPARATUS INCLUDING CHANGING A REPRODUCTION CHARACTERISTIC WHEN AN ERROR HAS OCCURRED IN REPRODUCED DATA

BACKGROUND OF THE INVENTION

The present invention relates to an optical disk apparatus and a magnetic disk apparatus, and concerns especially an apparatus which retries reading when a read-out data error has occurred during reading operation, and relates, in particular, to a recording and reproducing apparatus which can recover from a read-out data error.

DESCRIPTION OF THE PRIOR ART

It is extremely important to read out the written data correctly for the information recording and reproducing apparatus, including the optical disk apparatus and magnetic disk apparatus. The major technological problem for the recording and reproducing apparatus is how to ensure the data reliability. To solve said problem, efforts have been made to improve the data reliability through the introduction of the error correction code (ECC). When the reliability of the optical disk apparatus is compared with that of the magnetic disk apparatus, read-out data errors of the optical disk apparatus occur more frequently that those of the magnetic disk apparatus. When read-out data errors have occurred, error recovery is carried out in order to avoid error recovery failure. The read retry operations are performed to implement said error recovery.

In the conventional read retry operation, the controller specifies the number of retries, and read operations are performed repeatedly when the read-out data errors have occurred. If error recovery still fails even after time read operation, the disk head position is deviated from the center of the track or the data strobe position is deviated from the normal position, then read operations are then repeated. To be concrete, said procedure is standardized for Enhanced Small Disk Interface (ESDI), which also serves as an interface.

SUMMARY OF THE INVENTION

The optical disk apparatus and magnetic disk apparatus are required to have higher and higher recording density every year, and severe requirements are imposed on reproduction of the readout data. That is, higher recording density requires reduced size and increased speed of signals read out from the recording medium, as well as reduced signal-to-noise ratio. To improve system performance, the disk apparatus tends to increase the number of revolutions of the recording medium in addition to the recording density. This has increased the speed of phase-synchronized clock pulses and writing clock pulses to identify the read-out data, and has reduced the read-out data reproduction margin.

In the optical disk apparatus, the data dropout is frequently caused by medium defects and dirt. Because of said data dropout, phase-synchronized clock pulses cannot be phase-synchronized with the read-out data, or phase-synchronized clock pulses deviate a lot from the specified frequency, making it difficult to identify the read-out data.

For the above reasons, read-out data errors occur frequently in the read operation, and the conventional technique has had a serious problem in that error recovery cannot be achieved.

An object of the present invention is to provide a recording and reproducing apparatus which has the function to recover from the read-out data error; said function has been absent in the conventional read retry operation.

The above object is accomplished according to the present invention by providing a recording and reproducing apparatus which comprises; (1) a drive circuit which provides driving so as to rotate a recording medium, (2) a recording circuit which records information on the recording medium rotated, (3) a reproducing circuit which reproduces the information From the recording medium rotated and which retries the reproduction of the information from an area in the recording medium where an error has occurred to the reproduced data in cases where such an error has occurred to the data reproduced in the process of reproducing information from the recording medium, and (4) a characteristic change circuit which changes a reproduction characteristic of the reproducing circuit, wherein the reproduction characteristic of the reproduction circuit is changed by the characteristic change circuit in cases where any error has occurred to the reproduced data in the process of reproducing information from the recording medium so that the reproduction circuit uses the changed reproduction characteristic to retry reproduction of information from the area in the recording medium where an error has occurred to the reproduced data.

BRIEF DESCRIPTION OF THE DRAWINGS

FIGS. 3(a) and 3(b) are timing charts illustrating the output from the frequency divider of the revolving speed changing unit shown in FIG. 2, FIG. 3(a) showing the output before revolving speed change, FIG. 3(b) the output after revolving speed change;

DETAILED DESCRIPTION OF THE PREFERRED EMBODIMENTS

Figure 1:
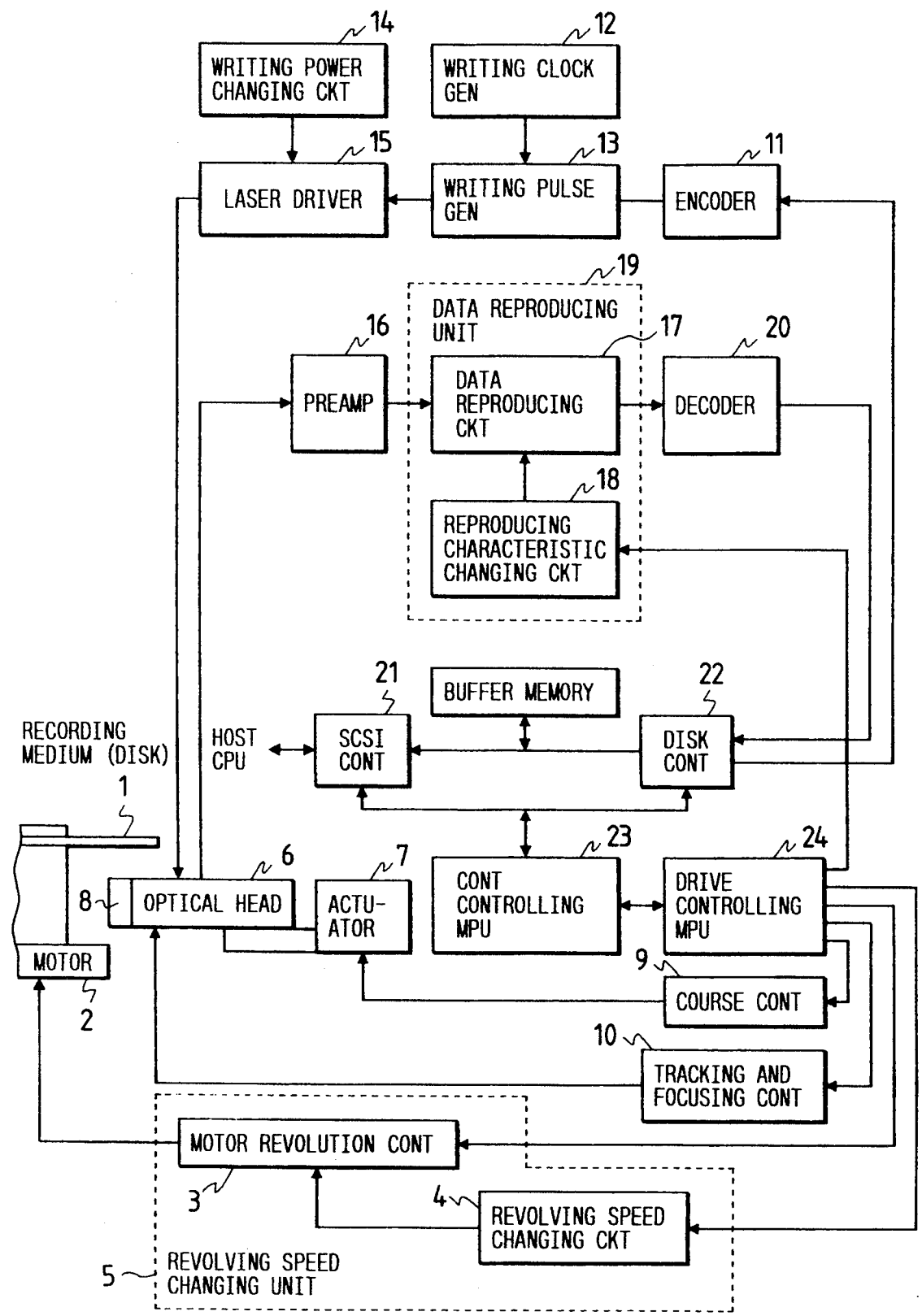
FIG. 1 is a block diagram showing an optical disk apparatus, an example of the first embodiment according to the present invention.

The following describes the preferred embodiments of the recording and reproducing apparatus according to the present invention. The first embodiment is described using the example of an optical disk apparatus. FIG. 1 is a functional block diagram for the optical disk apparatus according to the present invention.

The optical disk apparatus according to the present invention comprises revolving speed changing unit 5 which consists of motor 2 which drives recording medium 1, motor revolution control circuit 3 which controls motor 2 and revolving speed changing circuit 4, optical head 6 which writes or reads information from recording medium (disk) 1, actuators 7 and 8 which move optical head 6 to the specified position, course control circuit 9 which controls said actuator, and tracking and focusing control circuit 10, encoder 11 which writes information in the recording medium 1, writing clock generating circuit 12, write pulse generating circuit 13, writing power changing circuit 14, laser drive 15, preamplifier 16, data reproducing unit 19 consisting of data reproducing circuit 17 and reproducing characteristic changing circuit 18, decoder 20, SCSI controller 21 which controls the entire system including the data write/read control, disk controller 22, controller controlling MPU 23, and drive controlling MPU 24.

Figure 2:
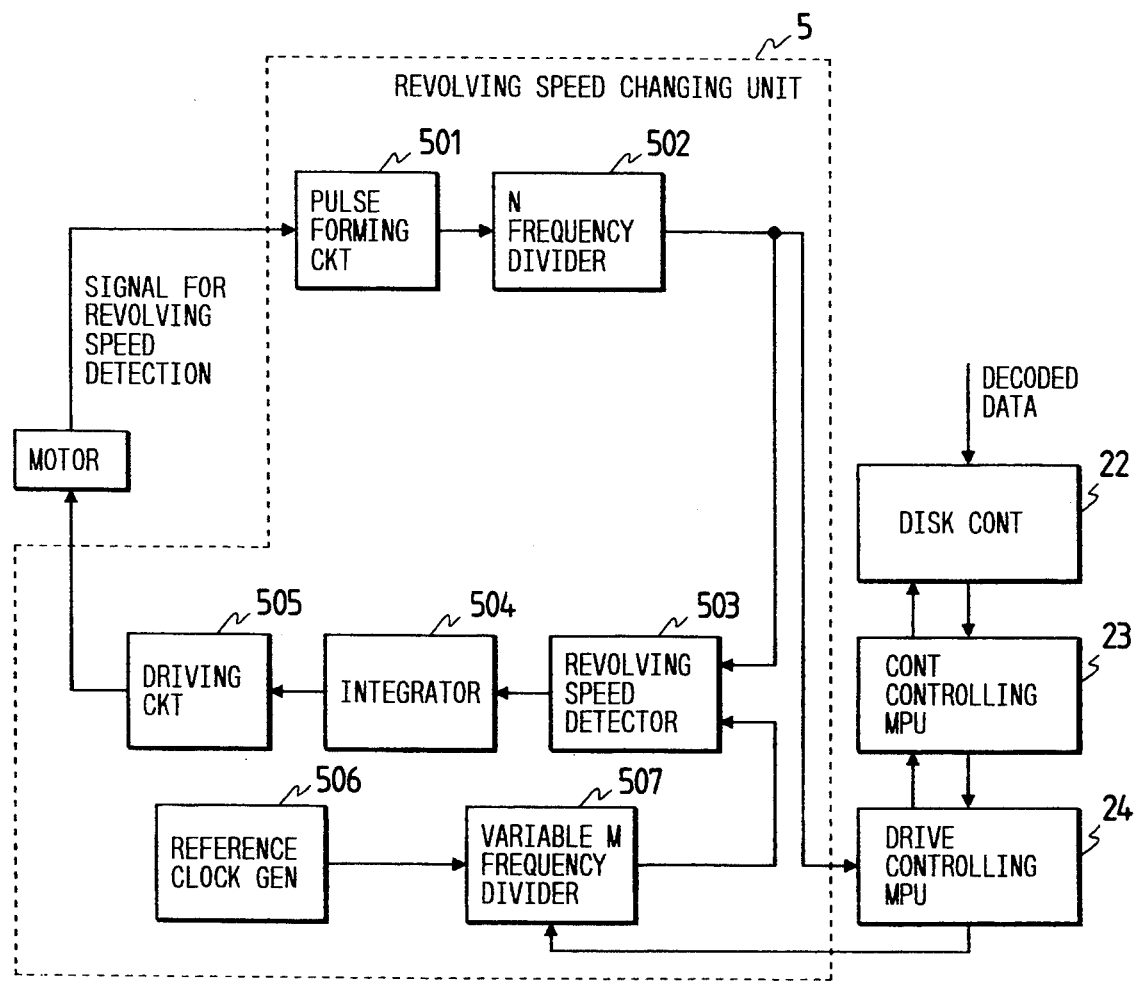
FIG. 2 is a block diagram showing a revolving speed changing unit used in the optical disk apparatus given in FIG. 1.

FIG. 2 is a circuit block diagram showing the revolving speed changing unit 5. The said revolving speed changing unit comprises pulse forming circuit 501, N frequency divider 502, revolving speed detector 503, integrator 504, driving circuit 505, reference clock generator 506 and variable M frequency divider 507.

The signal for revolving speed detection is produced, for example, by the hall element, and is transmitted to pulse forming circuit 501. The output from the pulse forming circuit is subjected to N frequency division at N frequency divider 502, and is sent to revolving speed detector 503.

The reference clock frequency which is output from reference clock generator 506 is subjected to M division at variable M frequency divider 507 and is sent to revolving speed detector 503. Revolving speed detector 503 compares the output from N frequency divider 502 with that from variable M frequency divider 507, and the motor is turned at the specified revolving speed by driving circuit 505 via integrator 504.

When any error has occurred to decoded data, it is detected by disk controller 22, and is notified to the controller controlling MPU 23. The controller controlling MPU 23 evaluates the conditions and changes the revolving speed; when it retries reproduction, it sends speed change instruction to drive controlling MPU 24. In conformity to said instruction, drive controlling MPU 24 changes the frequency division ratio of variable M frequency divider 507. To reduce the number of revolutions, the frequency division ratio is set at a large value, and reproduction is retried after the number of revolutions has been stabilized. The system determines if the specified revolving speed has been achieved or not, since drive controlling MPU 24 supervises the output from the N frequency divider 502.

FIG. 3 shows the output from the frequency divider at the time of changing the revolving speed.

When a reproduction data error has occurred, the frequency division ratio of the variable M frequency divider 507 is M1, while that of N frequency divider 502 is No By contrast, when reproduction is retried at a lower speed, the frequency division ratio of the variable M frequency divider 507 is M2, and that of N frequency divider 502 is N. Since the M2 is set at a greater value than the M1, t2 is greater than t1.

Figure 4A:
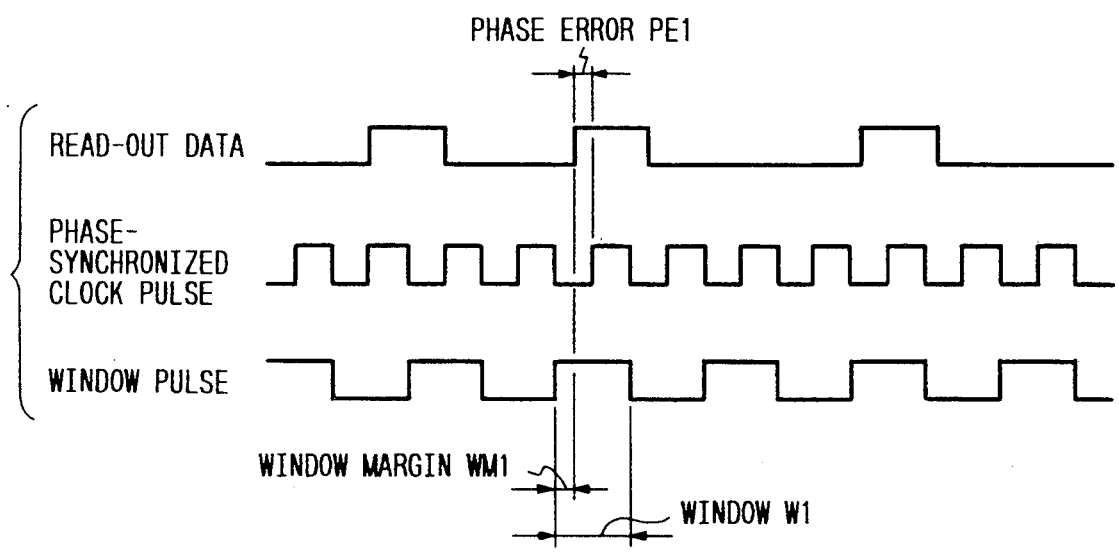
FIGS. 4(a) and 4(b) are the timing charts illustrating phase margins when the optical disk speed is normal and when it is low.
Figure 4B:
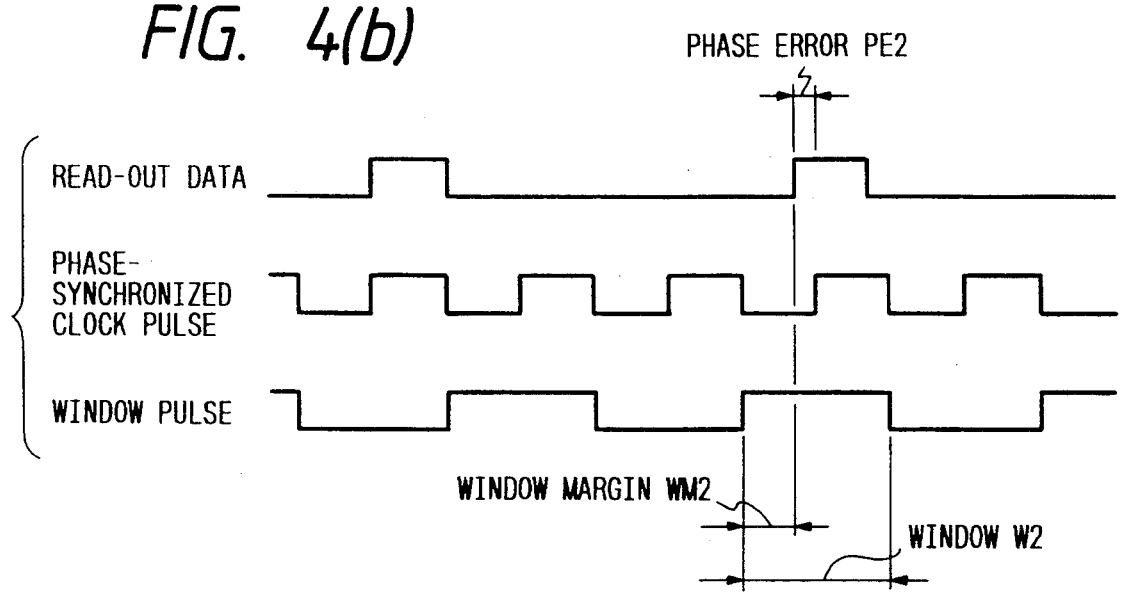

FIG. 4(a) shows the timing chart for the normal revolution, and FIG. 4(b) shows the timing chart to explain the expansion of the phase margin at a lower revolving speed. Phase-synchronizing circuit 192 in FIG. 5 generates phase-synchronized clock pulses synchronized with the read-out data. Based on these Phase-synchronized clock pulses, the window is generated to identify the reproduced data using the frequency divider.

In normal data reading, the rising edge of the data read in window W1 is detected to identify the data, as shown in FIG. 4(a). When the recording density is increased, however, the read-out data is fluctuated greatly by the interference between waveform in addition to the medium noise and circuit noise. This makes it impossible to achieve a perfect phase synchronization of the phase-synchronized clock pulse with the read-out data. Thus, phase error PEI occurs between the read-out data and the phase-synchronized clock pulse; this reduces window margin WM1 for data identification. Under the above-mentioned condition, there is a greater possibility for the occurrence of reproduced data errors.

By contrast, window W2 is increased in width at a lower speed, as illustrated in FIG. 4(b), and this results in expansion of window margin WM2. This will lead to a reduced possibility for the occurrence of reproduced data errors.

Figure 5:
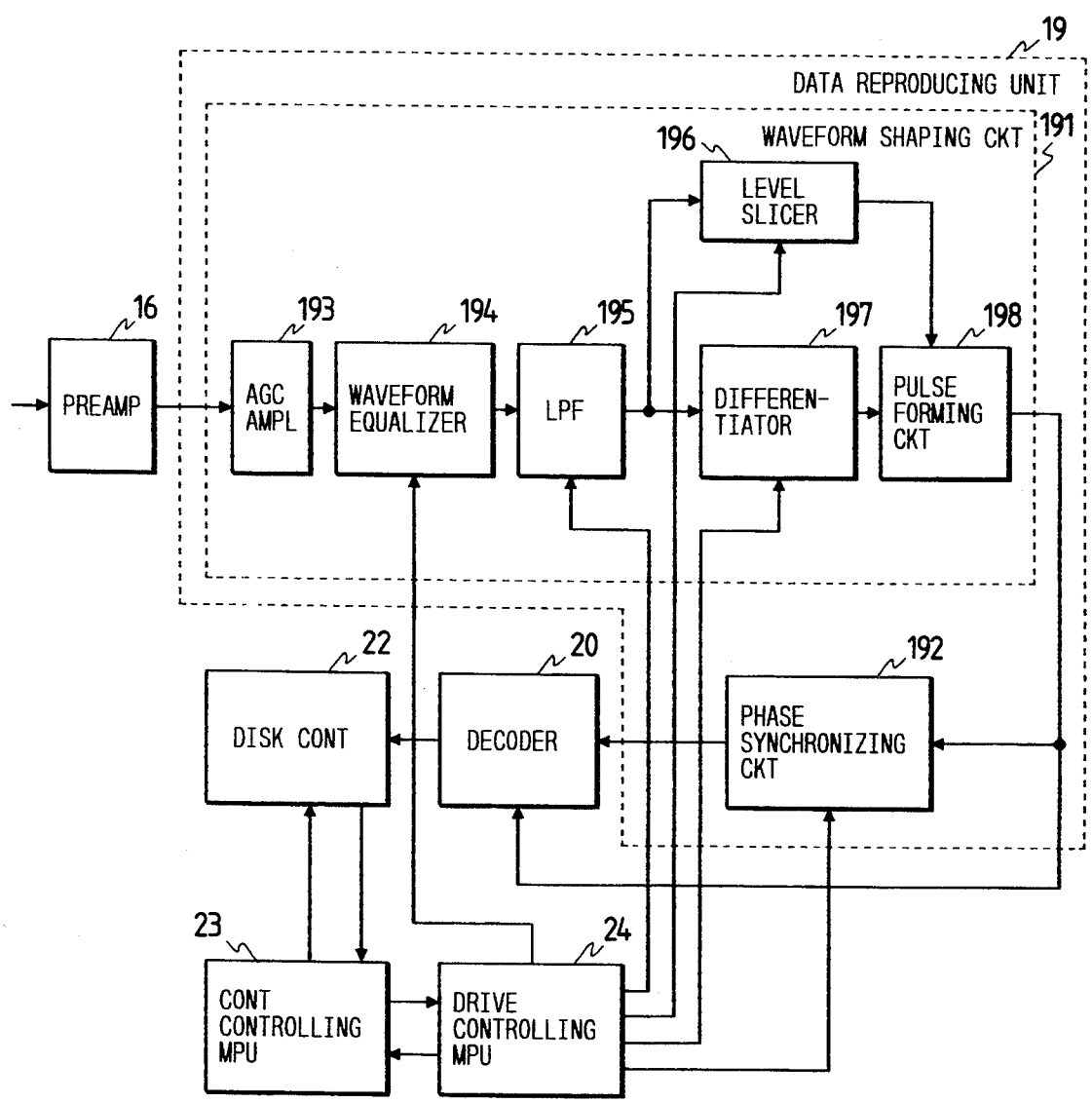
FIG. 5 is a block diagram of the reproducing unit used in the optical disk apparatus given in FIG. 1.

FIG. 5 is a circuit block diagram for the data reproducing unit 19 according to the present invention, which permits reproducing characteristic change. Data reproducing unit 19 is basically composed of waveform shaping circuit 191 and phase-synchronizing circuit 192, where data reproducing unit 19 comprises AGC amplifier 193, waveform equalizer 194, LPF 195, level slicer 196, differentiator 197, pulse forming circuit 198 and phase-synchronizing circuit 192. Decoder 20 comprises the decoder for the read-out data being encoded and the window generation circuit to identify the read-out data.

When disk controller 22 has detected a reproduced data error, the characteristics of the waveform shaping circuit 191 and phase-synchronizing circuit 192 are changed through the controller controlling MPU 23 and drive controlling MPU 24, and reproduction is retried.

Figure 6:
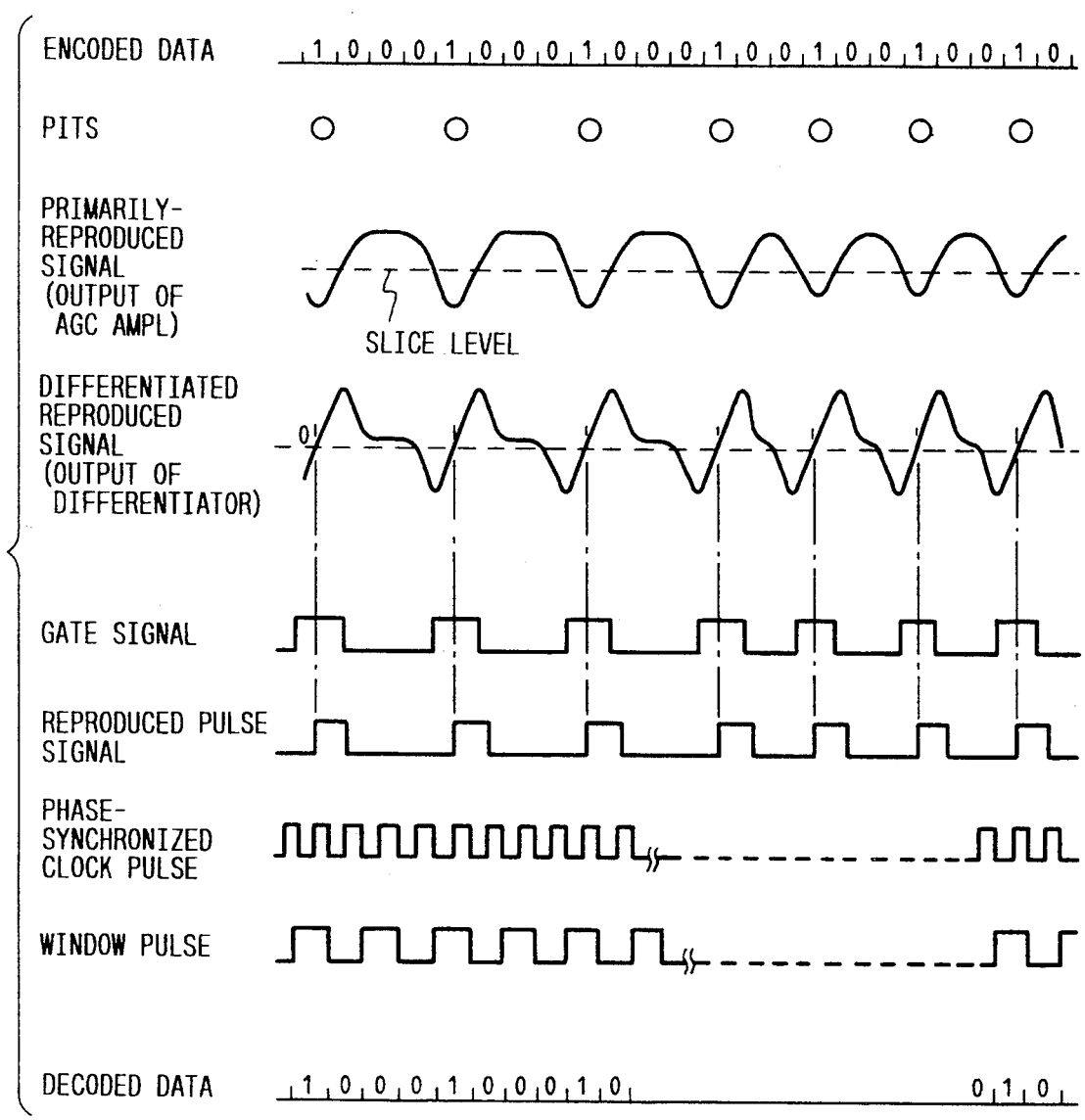
FIG. 6 is a timing chart denoting a signal waveform in each part of the reproducing unit shown in FIG. 5.

FIG. 6 shows each signal waveform of the data reproducing unit. The bit corresponding to the coded data is formed on the recording medium based on the recorded data. Reading instruction signals with uneven amplitude are sent into the AGC amplifier 193 through the optical head and preamplifier. AGC amplifier 193 has a function to make uniform the amplitude of the reading instruction signal, where the output of the AGC amplifier 193 is used as primarily-reproduced signal. This primarily-reproduced signal is subjected to level slicing at a certain value through level slicer 196, and the gate signal is generated. To detect the peak of the primarily-reproduced signal, differentiator 197 is used for differentiation. That is, the differentiated reproduced signal is the output of differentiator 197.

The zero cross point of the differentiated reproduced signal represents the peak position of the primarily-reproduced signal. When the zero cross point is within the effective range of the gate signal, the reproduced pulse signal is produced by pulse forming circuit 198. To identify the reproduced pulse signal or read-out data, the phase-synchronized clock pulse synchronized with the read-out data is produced. Based on the phase-synchronized clock pulse, the window is generated and the reproduced data is decoded and sent to the disk controller in the succeeding stage.

Actually, a great variety of noises are superimposed on the primarily-reproduced signal and the signal itself is distorted. This makes it very difficult to reproduce the data. Accordingly, the reproducing characteristic is greatly changed by varying the level slice value and differentiator characteristic.

Figure 7A:
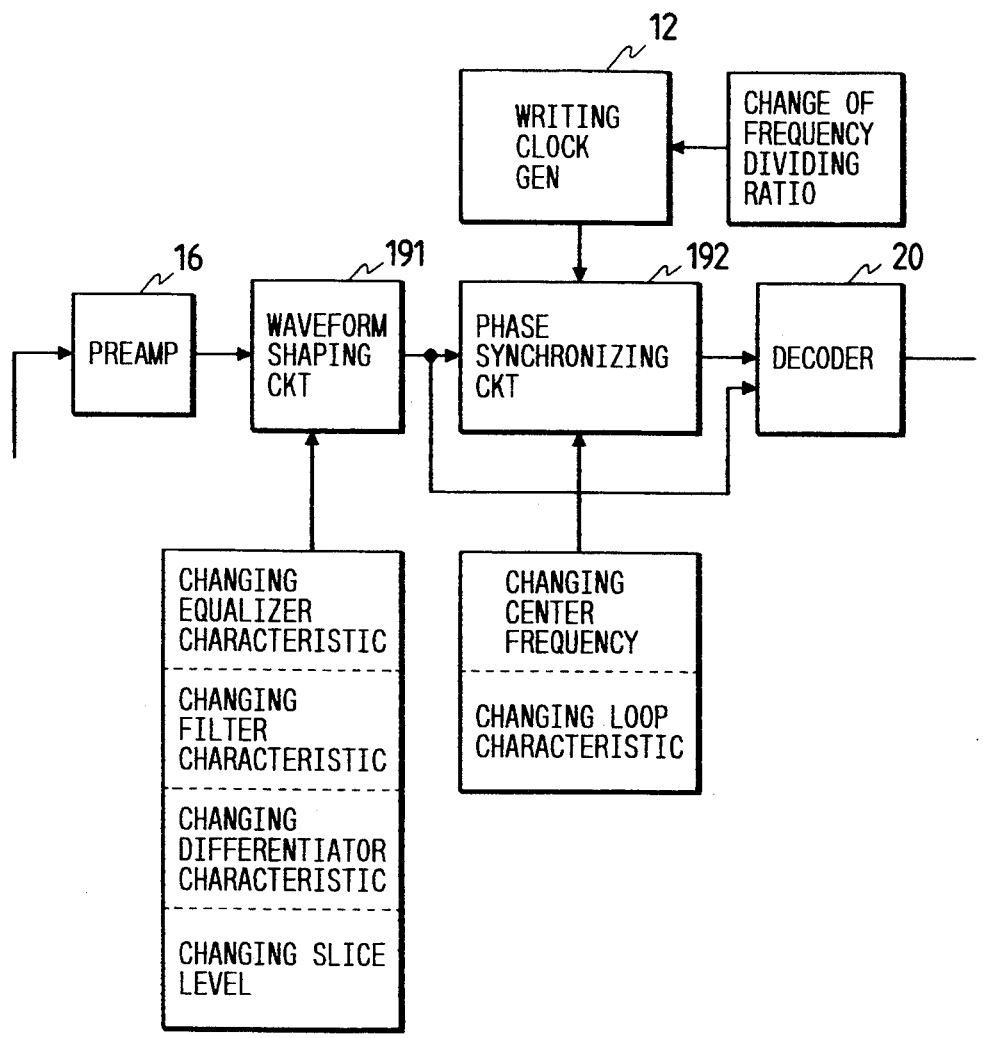
FIG. 7(a) is a block diagram showing the characteristic changing parameter of the reproducing unit given in FIG. 5.

FIG. 7(a) shows the characteristic changing parameter in the data reproducing unit. The waveform shaping circuit 191 provides changing of the equalizer characteristic, filter characteristic, differentiator characteristics and the slice level, while phase-synchronizing circuit 192 provides changing of the center frequency and loop characteristic.

In the non-read mode, the write clock pulse, the output of writing clock generating circuit 12, should be used as data for comparison in phase-synchronizing circuit 192. Use of the write clock pulse permits phase-synchronization with the early read-out data in the read mode. It also serves to eliminate the problem of operation errors in the phase synchronizing circuit.

When changing the revolving speed in the retrial of reproduction, the write clock frequency must be changed.

To change the revolving speed in the retrial of reproduction, at least one of the equalizer characteristic, filter characteristic, differentiator characteristic and slice level changing parameters should be selected according to the read frequency for pulse shaping circuit 191, and at least one of the center frequency and loop characteristic changing parameters should be selected for phase-synchronizing circuit 192. In the retrial for reproduction, only the characteristic change parameter of data reproducing unit 19 may be selected without changing the number of rotations.

It is also important to change the equalizer characteristic according to the read frequency and minimize the interruption between waveform. The filter cut-off frequency greatly affects the reproduction performance in eliminating noise. Therefore, when the frequency is reduced, the cut-off frequency should also be reduced accordingly.

Since the differentiated signal amplitude is reduced in proportion to the reduction of the revolving speed, it is also effective to increase the differentiator gain or to reduce the differentiator frequency. The reproducing characteristic is also changed by varying the slice level.

Figure 7B:
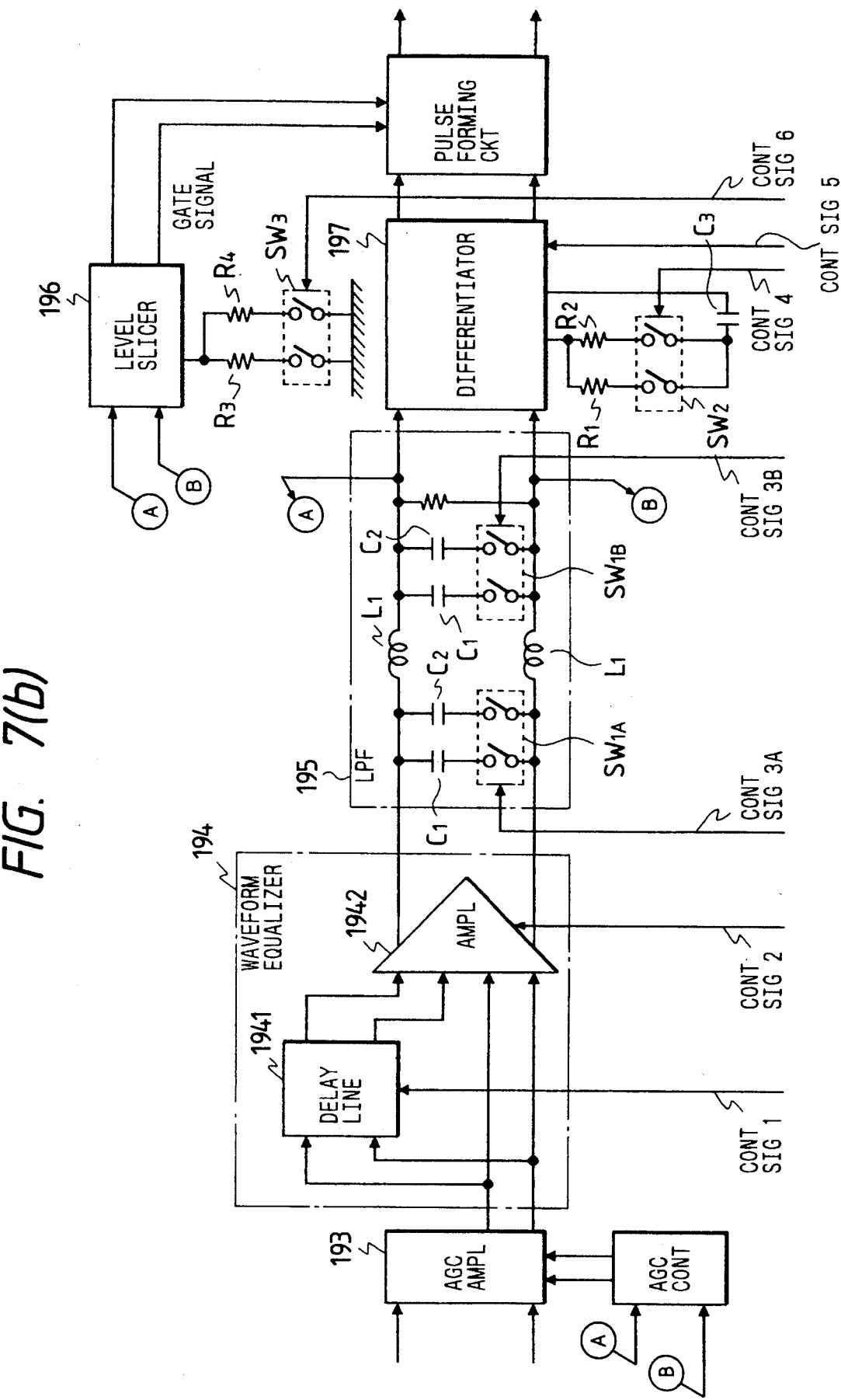
FIG. 7(b) is a block diagram showing an example of the characteristic changing circuit in the pulse shaping circuit of the reproducing unit given in FIG. 5.

FIG. 7(b) shows an example of the reproducing characteristics changing circuit of waveform shaping circuit 191.

Waveform equalizer 194 comprises delay line 1941 and amplifier 1942, and is used to reduce the peak shift due to the interruption between waveform. The output of AGC amplifier 193 is directly put into amplifier 1942 or is put into amplifier 1942 through delay line 1941. Amplifier 1942 uses both input signals to equalize the waveform, in other words, to carry out waveform sliming.

The amplitude of the signal which has been delayed by delay line 1941 for the specified time is reduced in amplifier 1942 with respect to the signal directly put into the amplifier 1942, and its polarity is reserved. After that, it is added to the signal which is input directly to amplifier 1942. Therefore, to change the equalizer characteristic, the delay time given to the signal should be changed by delay signal 1941, or the amplitude of the output signal of delay signal 1941 should be changed by amplifier 1942. For said change, the output tap of delay line 1941 is selected by using control signal 1, or the gain of amplifier 1942 is controlled by using control signal 2.

LPF195 consists of capacitor C and inductance L. FIG. 7(b) is shown a third order Butterworth filter. Cut-off frequency fc of the LPF is expressed by:

$$fc \propto \frac{1}{2\pi} \cdot \sqrt{\frac{1}{L \cdot C}}$$

So to change the cut-off frequency fc, the value of capacitor C should be changed. Cut-off frequency fc can be changed if control signals 3A and 3B are sent so that switches SW1A and SW1B will select C1 or C2.

Differentiator 197 is an amplifier to generate the differential signal for peak detection from the analog output signal of LPF 195. The gain off differentiator 197 can be changed by varying the resistance inside the amplifier constituting the differentiator by means of control signal 5. Pole fd of the differentiator characteristic is given by:

$$fd \approx \frac{1}{2\pi RC}$$

So pole fd can be changed if control signal 5 is sent so that switch SW2 will select resistor R1 or R2. For example, when the revolving speed is set at a low value, resistance R is increased and pole fd is set at a low value.

The gate signal is generated when the output of LPF 195 is sliced to a specified level by level slicer 196. The slice level in level slicer 196 can be changed when control signal 6 is sent so that switch SW3 will select resistor R3 or R4. For example when the read signal has a poor quality with much noise, it is effective to set the slice level at a high value. Regarding the changing of the cut-off frequency of LPF 195, the pole of the differentiator characteristic and slice level, the above description used the two-step switching circuit to describe the change circuit. Use of the three or more than three-step switching circuit will permit change in multiple steps.

Change of the revolving speed will result in change of the read frequency, wherein, the center frequency of phase-synchronizing circuit 192 should be changed.

Since the phase-synchronizing characteristic or phase error difference error greatly depends on the loop characteristic, loop characteristic change is effective for the retrial of reproduction.

When a reproduced data error has occurred, the reproducing characteristic changing parameter is selected to retry reproduction; this permits recovery from data error.

Figure 7C:
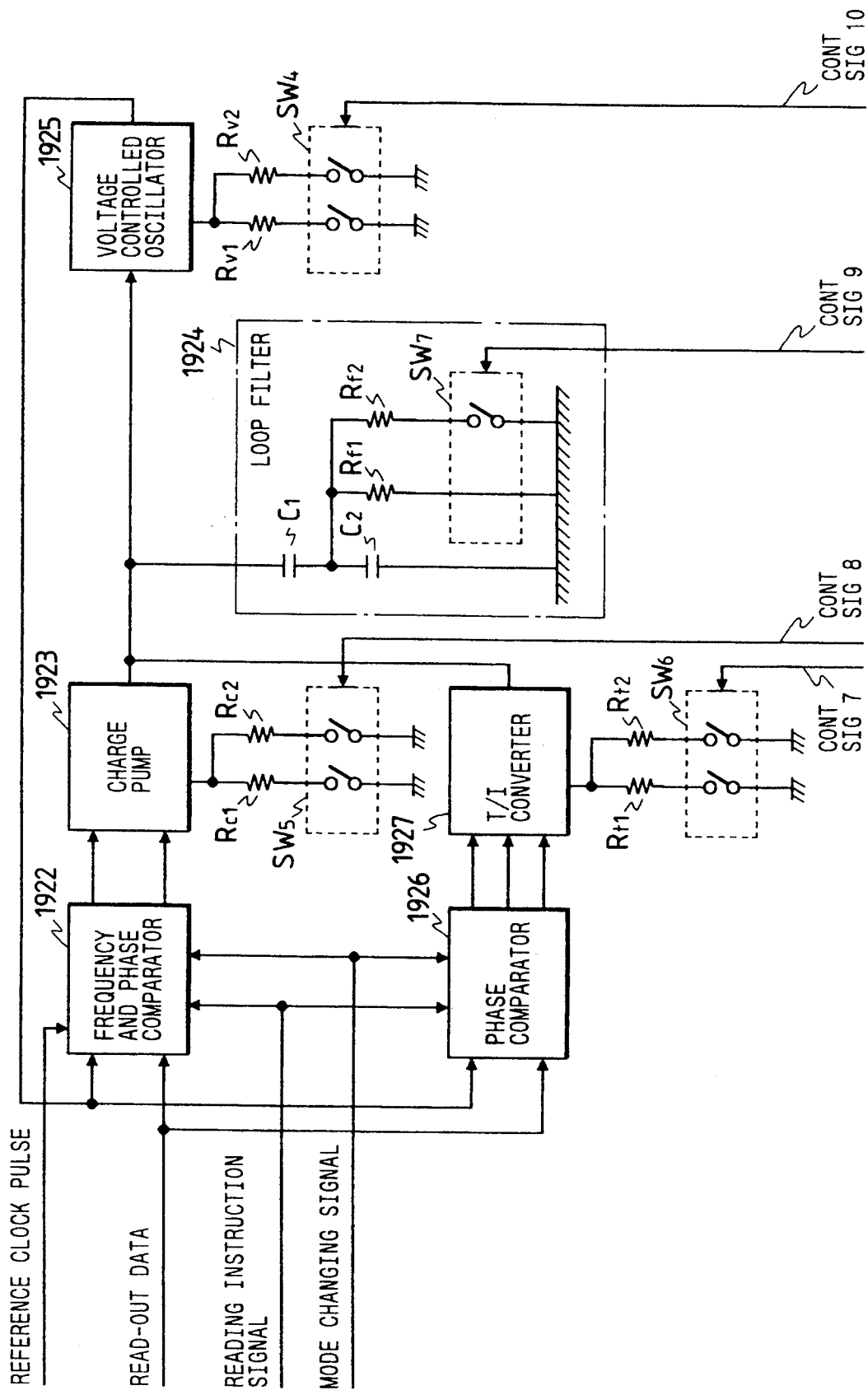
FIG. 7(c) is a block diagram showing an example of the characteristic changing circuit in the phase-synchronizing circuit of the reproducing unit given in FIG. 5.

FIG. 7(c) shows an example of the reproduction characteristic changing circuit of phase-synchronizing circuit 192. The center frequency fo of voltage control oscillator 1925 is proportional to the emitter current of the voltage control oscillator. So center frequency fo can be changed if control signal 10 is sent so that switch SW4 will select resistor Rv1 or Rv2.

As described below, phase-synchronizing circuit 192 has two functions; one is a high-speed pull-in process for quick synchronization with the frequency and phase of the read-out data and the other is a phase follow-up process which ensures stable follow-up of the read-out data phase. The system comprising frequency phase comparator 1922, charge pump 1923, loop filter 1924 and voltage control oscillator 1975 is selected and used in the high-speed pull-in process. The system consisting of phase comparator 1926, T/I converter (a circuit to convert time difference to electric current value) 1927, loop filter 1924 and voltage control oscillator 1925 is selected and used in the phase follow-up process.

The characteristic frequency ωnH of phase-synchronizing circuit 192 in the pull-in mode and the characteristic frequency ωnN in the follow-up mode are expressed by:

$$\omega nH = \sqrt{\frac{Ko \cdot (\alpha \cdot Ic + It)}{\pi \cdot C1}}$$

$$\omega nN = \sqrt{\frac{Ko \cdot It}{\pi \cdot C1}}$$

where "Ko" is the gain of voltage control oscillator 1925, "It" is output current of charge pump 1923, "It" is output current of T/I converter 1927 and "α" is a coefficient determined by the pull-in pattern present in the recorded information.

Therefore, the characteristic frequency of phase-synchronizing circuit 192 can be changed by varying output current Ic from charge pump 1923 or output current It of T/I converter 1927. In FIG. 7(c), current Ic can be changed if control signal 8 is sent so that switch SW5 selects resistor Rc1 or Rc2. Current It can also be changed when control signal 7 is sent so that switch SW6 selects resistor Rt1 or Rt2.

Attenuation factor ζH in the high-speed pull-up mode of the phase-synchronizing circuit and attenuation factor ζN in the follow-up mode are expressed by:

$$\zeta H = \frac{(C1 + C2)}{2} \cdot \frac{Rf1 \cdot Rf2}{Rf1 + Rf2} \cdot \omega nH$$

$$\zeta N = \frac{(C1 + C2)}{2} \cdot Rf1 \cdot \omega nN$$

Thus, switch SW7 is controlled by control signal 9, and is set to ON in the high-speed pull-up mode, and to OFF in the follow-up mode.

The following describes another embodiment of the recording and reproducing apparatus according to the present invention.

Figure 8:
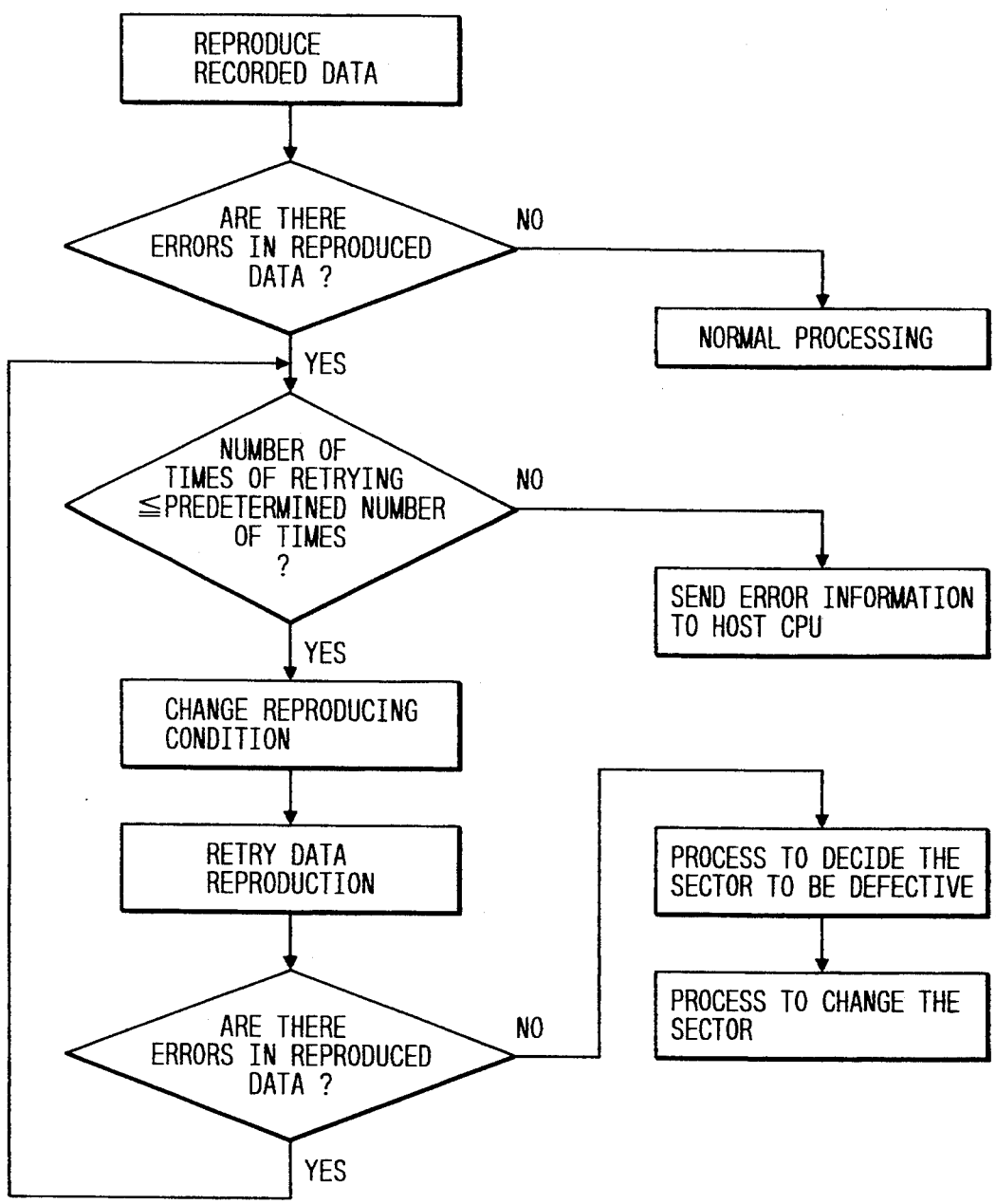
FIG. 8 is a timing chart for data reproduction retrial.

FIG. 8 is a flowchart showing retrial for data reproduction.

Data reproduction is performed in the read mode, and if there is no error in the reproduced data, the read command terminates correctly. However, if there is any error in the reproduced data, reproducing conditions are changed and the data are reproduced again, if the number of retrials for reproduction is below the specified value. If there is still any error in the reproduced data even after the specified number of retrials for reproduction has been exceeded, error information is transmitted to the host CPU.

If the data is read correctly in the retrial for reproduction, that area or sector is identified as faulty, and access is disabled. At the same time, the sector is changed.

The number of retrials for reproduction and reproducing conditions are predetermined. When any read error has occurred, for example, the system is set in such a way that track offset is performed first, and data reading is performed several times. If error recovery still fails, perfect error recovery is achieved by changing the revolving speed and reproducing characteristics.

Figure 9:
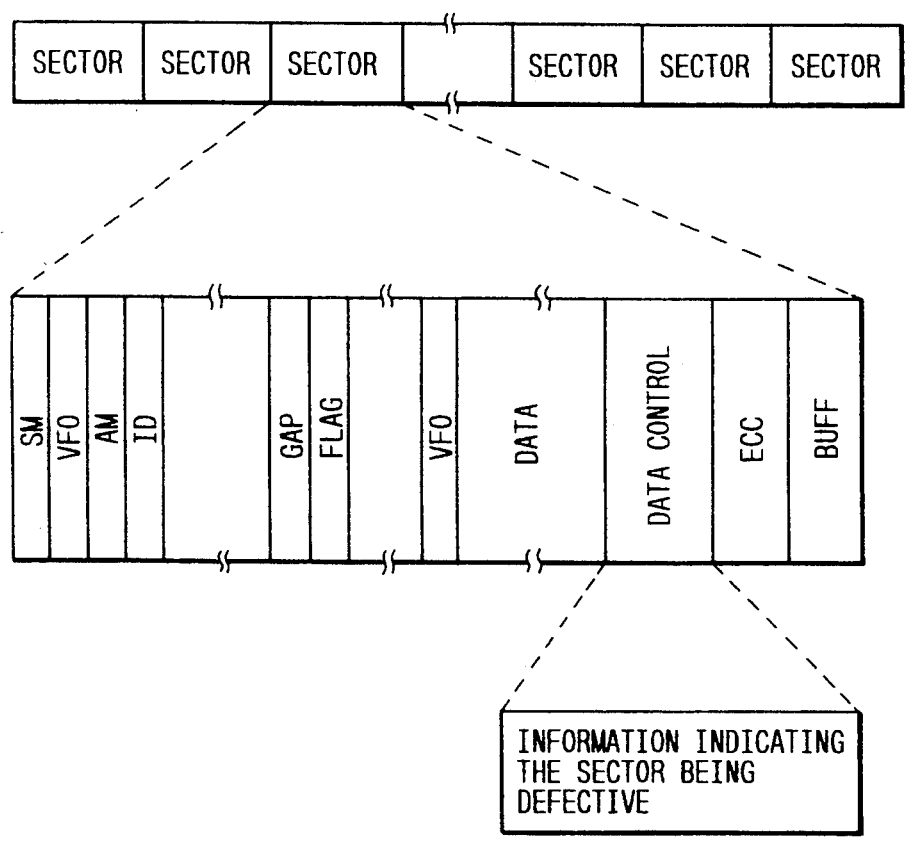
FIG. 9 denotes an example of the defective sector information management area.

FIG. 9 shows an example of the faulty sector information management area.

When a reproduced data error has occurred, and error recovery has been achieved by changing such reproduction parameters as track offset, revolving speed and reproducing characteristic, information on the faulty sector is written so that area or that sector on the recording medium cannot be accessed. When the information is written, the revolving speed is the same as in the normal writing mode.

In the case of the optical disk apparatus, each sector is provided with the data control area, so information on the faulty sector is written in the data control area.

The following describes still another embodiment of the recording and reproducing apparatus according to the present invention.

Figure 10:
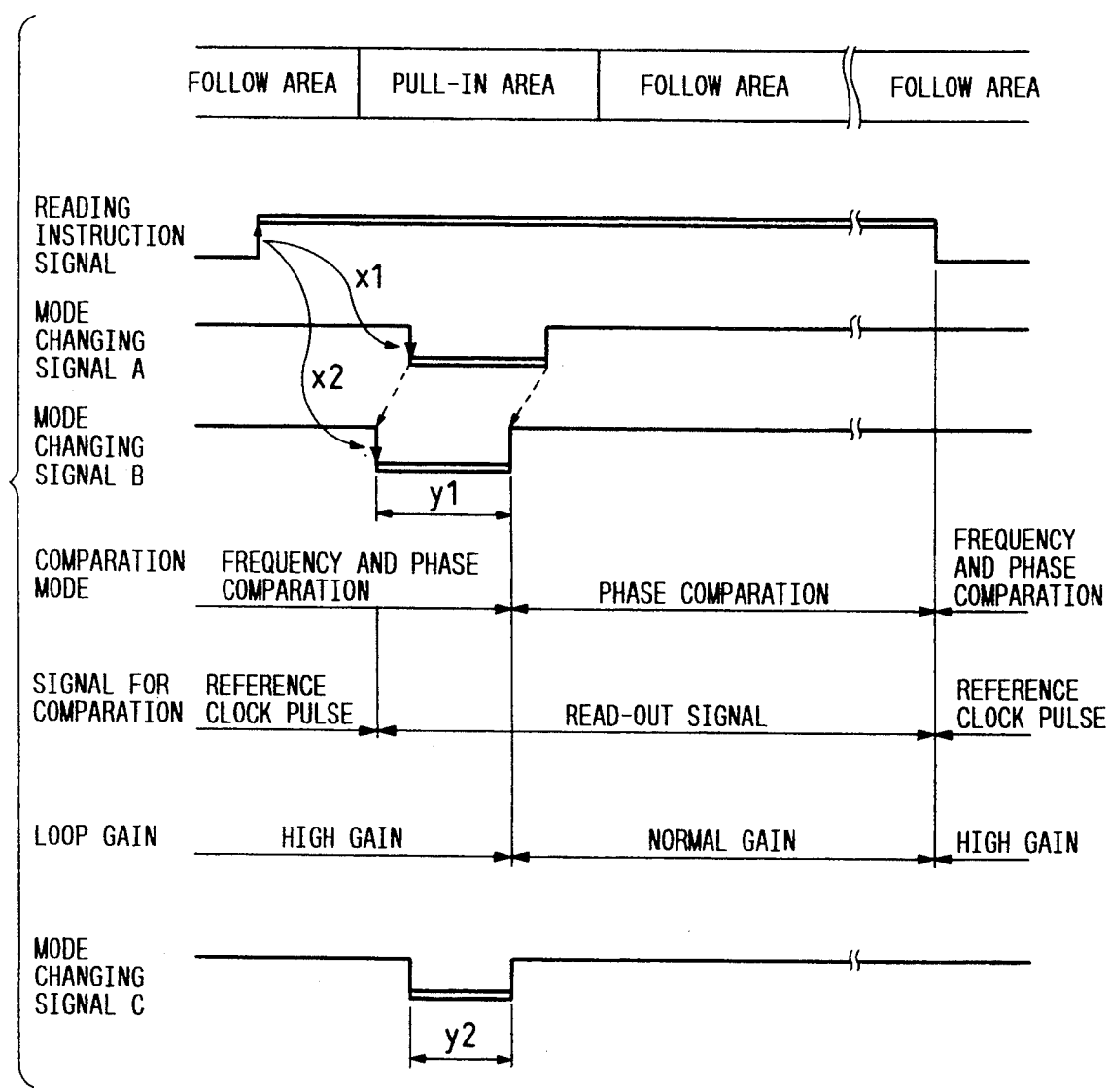
FIG. 10 is a chart illustrating the pull-in timing for the phase synchronizing circuit in the second embodiment of the present invention.

FIG. 10 shows the pull-in timing for the phase-synchronizing circuit.

Phase-synchronizing circuit functions include a high-speed pull-in process which ensures quick synchronization with the frequency and phase of the read-out data and a phase follow-up process which ensures stable follow-up of the read-out data phase. Therefore, the recorded information of the recording and reproducing apparatus is provided with the pull-in area and follow area in order to fill the requirements of the above-mentioned processes, as illustrated in FIG. 10. In the sector shown in FIG. 9, for example, the VFO area corresponds to the pull-in area, while the area other than VFO area corresponds to the follow area.

Since high-speed pull-in operation is performed in the high-speed pull-in area and phase follow-up in the follow area, the information in the pull-in area is composed of a certain repetitive pattern (VFO).

In the high-speed pull-in process, the loop gain is set at a high value to ensure quick phase synchronization; therefore, if data dropout due to recording medium defects or data erasure occurs in the high-speed pull-in process, phase difference error will increase, disabling phase follow-up in the next process. This will result in reproduced data errors.

A high-speed pull-in operation is carried out when mode changing signals are at a low level in FIG. 10, wherein a certain repetitive pattern is input. Accordingly, use is made of the frequency phase comparison mode which features high speed pull-in operation.

If there is any failure such as data dropout at the close of the high-speed pull-in process, the above-mentioned problem will arise.

At the time of retrying reproduction, the defect is eliminated by changing the mode changing signal, thereby ensuring subsequent correct phase follow-up operations.

Mode changing signal A does not allow phase synchronization, but it does if converted into mode changing signals B and C. The mode changing signal can be generated from the reading instruction signal and phase synchronizing clock pulse.

Figure 11:
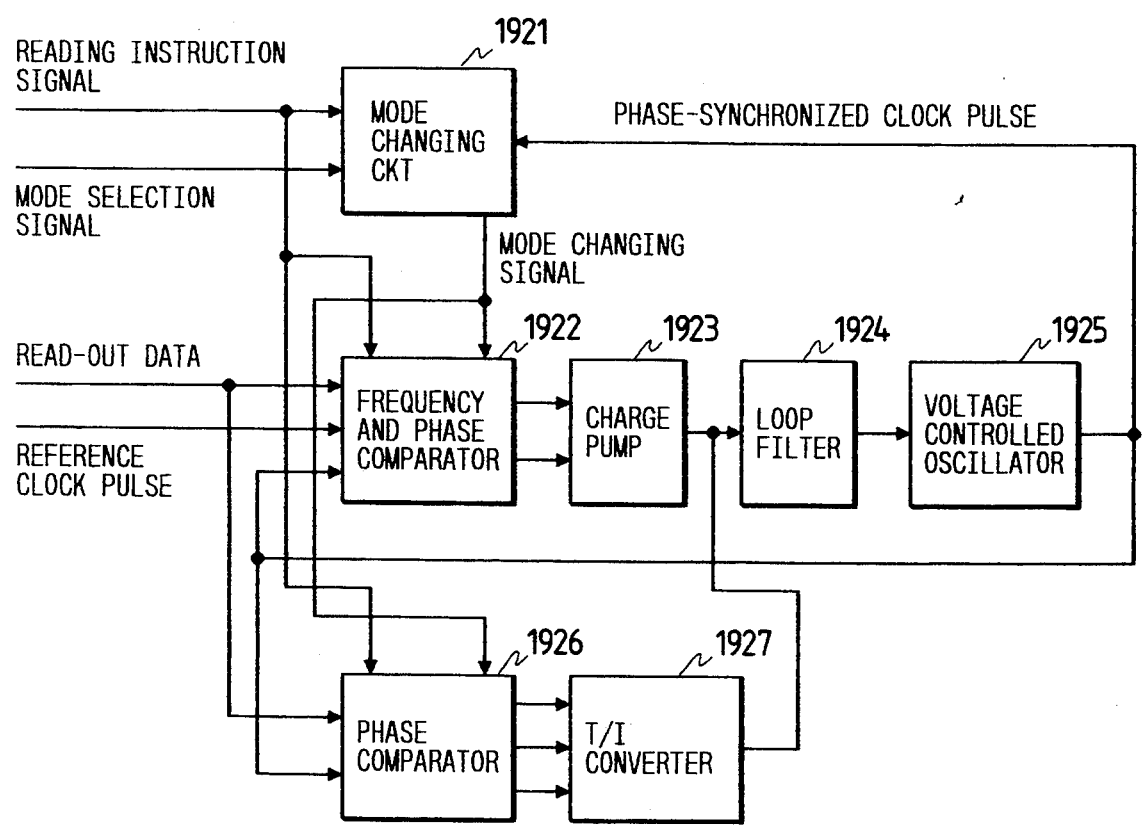
FIG. 11 is a block diagram showing the phase synchronizing circuit in the second embodiment of the present invention.

FIG. 11 shows the configuration of the phase-synchronizing circuit in said embodiment.

Receiving the reading instruction signal and mode selecting signal, mode changing circuit 1921 generates the mode changing signal. In the high-speed pull-in process the phase synchronizing circuit comprises, frequency phase comparator 1922, charge pump 1923, loop filter 1924 and voltage control oscillator 1925. In the phase follow process, the phase synchronizing circuit consists of phase comparator 1926, T/I converter 1927, loop filter 1924 and voltage control oscillator 1925.

Figure 12:
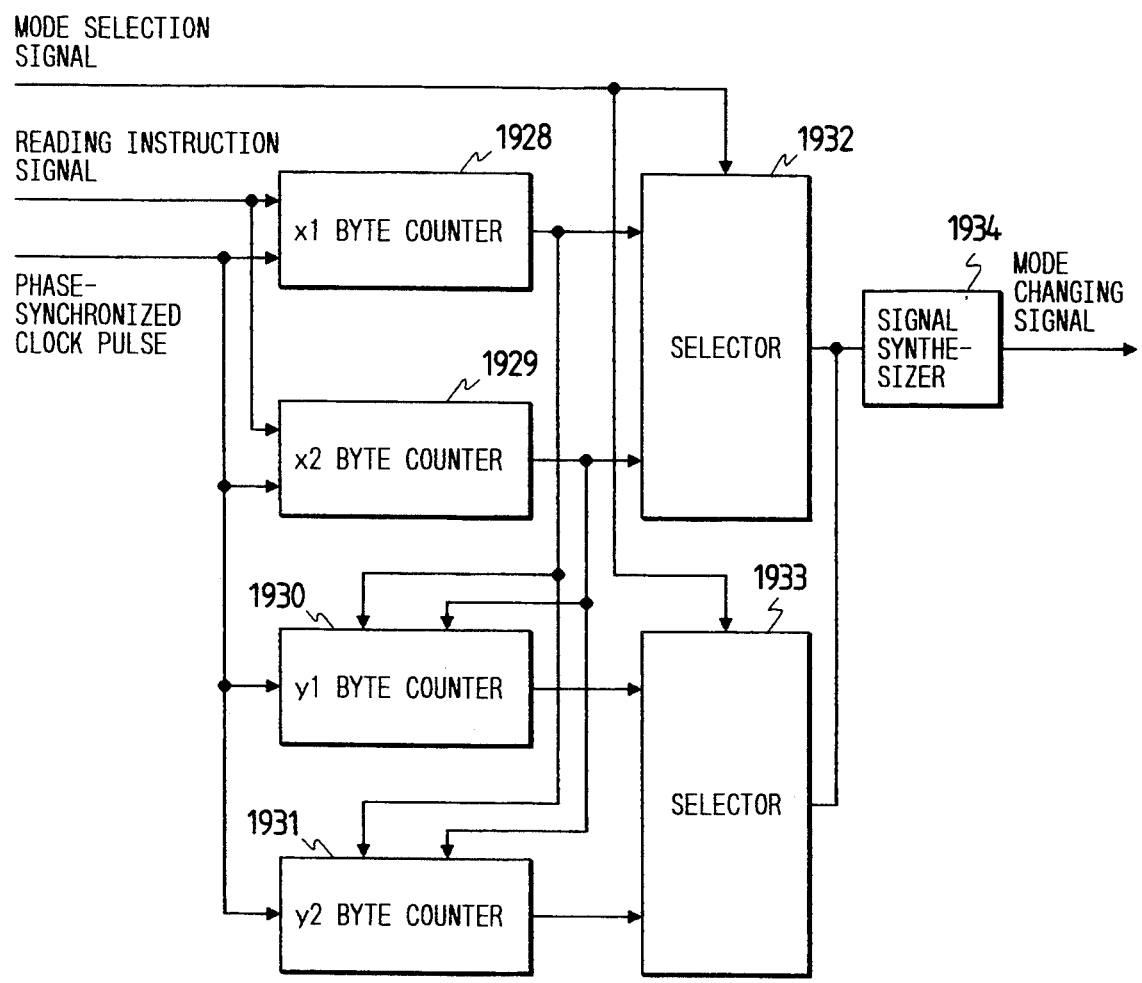
FIG. 12 is a block diagram showing the mode changing circuit used in the phase synchronizing circuit given in FIG. 11.

FIG. 12 denotes mode changing circuit 1921. The mode changing signal can be generated by detecting the rising edge of the reading instruction signal, and counting the phase-synchronized clock pulses.

As shown in FIG. 12, the output from x1 byte counter 1928 or x2 byte counter 1929 is selected by selector 1932 according to the mode selecting signal. The output from y1 byte counter 1930 or y2 byte counter 1931 is selected by selector 1933 according to the motor selector signal.

The signals output from both selectors are passed through the signal synthesizer 1943 to produce the mode changing signal.

The mode changing signals may be generated by changing the timing of rise of the reading instruction signal to be detected, and counting the phase-synchronized clock pulses.

The following describes still another embodiment of the recording and reproducing apparatus according to the present invention.

Figure 13A:
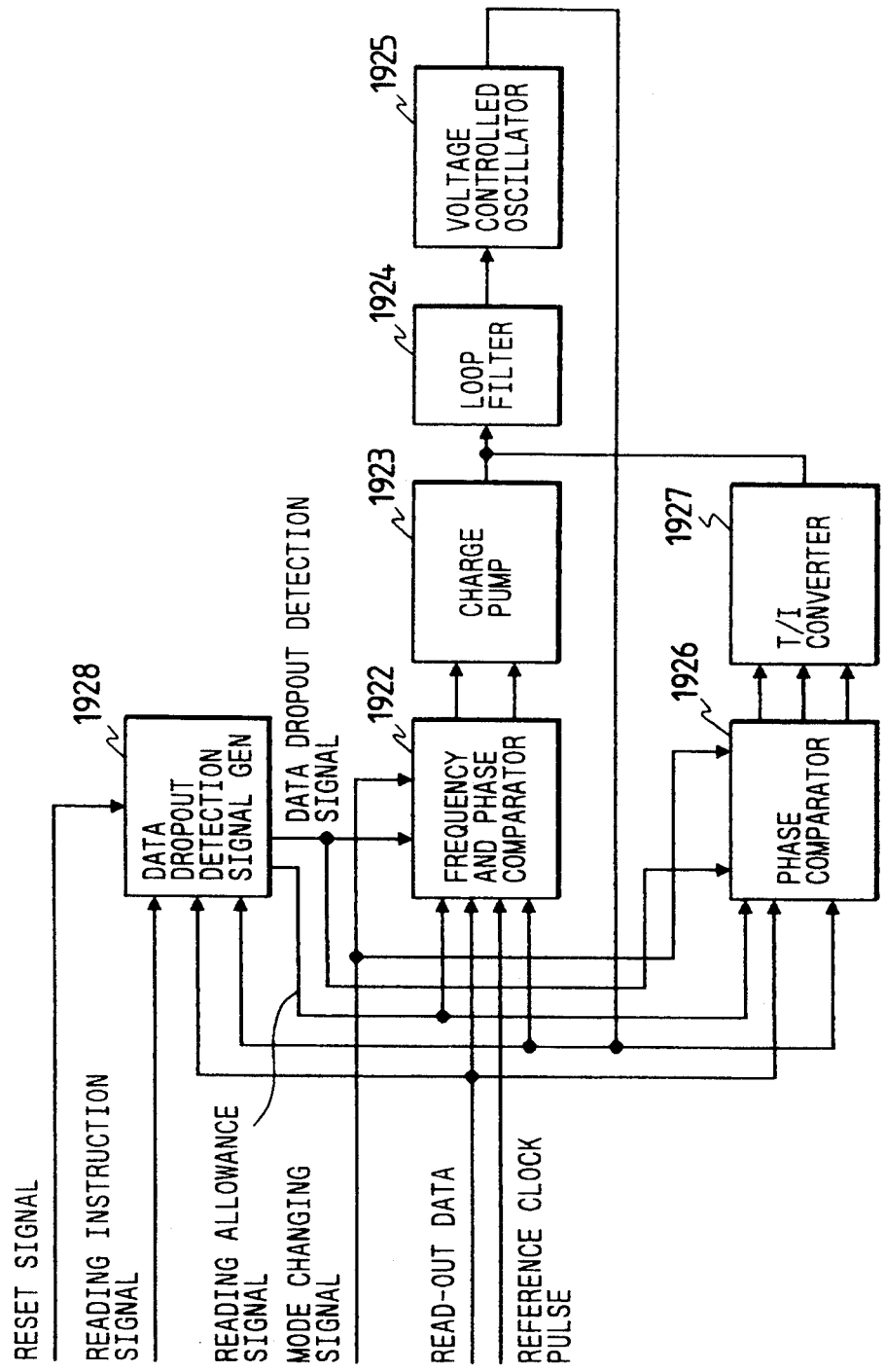
FIG. 13(a) is a block diagram showing the phase synchronizing circuit in the third embodiment of the present invention.
Figure 13B:
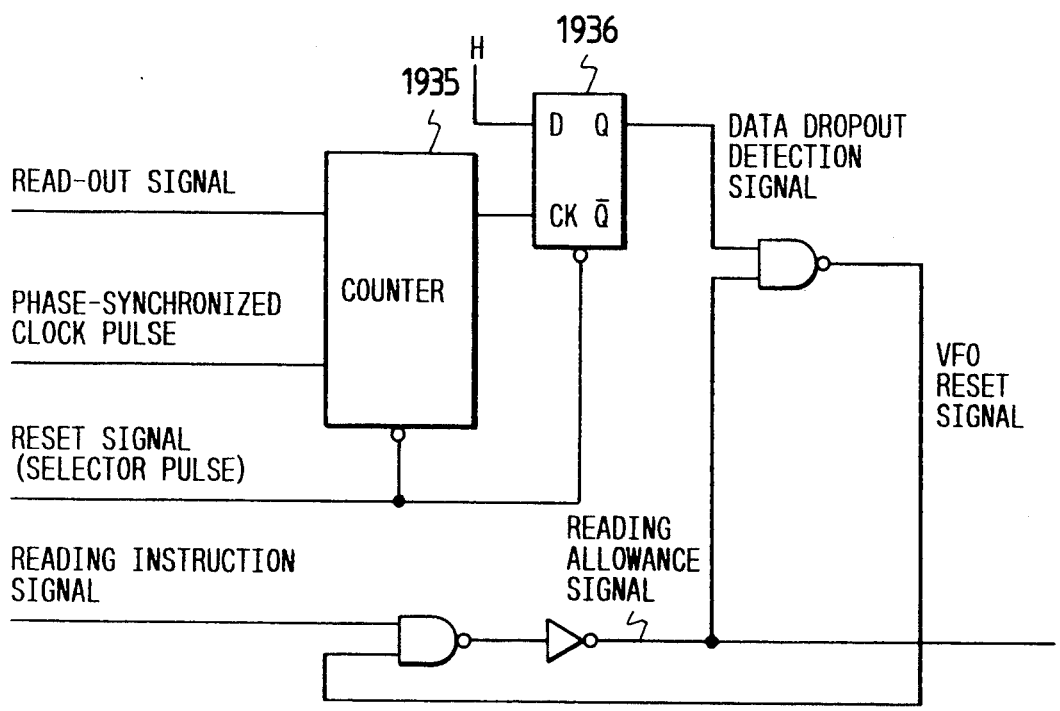
FIG. 13(b) is a block diagram showing the data dropout detecting signal generation circuit used for the phase synchronizing circuit given in FIG. 13(a)
Figure 13C:
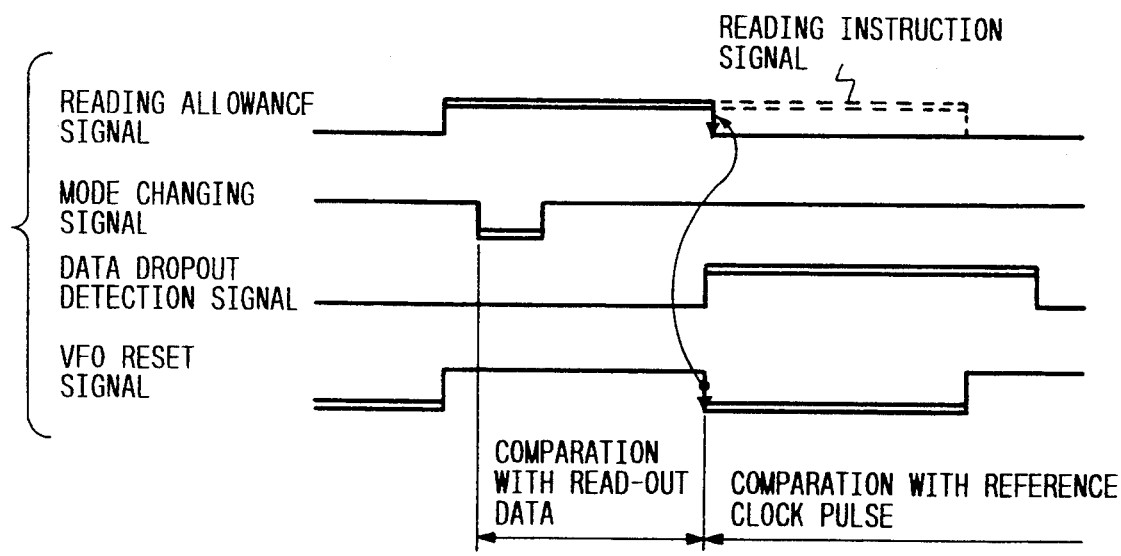
FIG. 13(c) is a signal timing chart for each part of the data dropout detecting signal generation circuit shown in FIG. 13(b)

FIG. 13(a) is a block diagram of the phase synchronizing circuit of said embodiment, and FIG. 13(b) is a block diagram of the data dropout detection signal generating circuit 1928 used in the phase synchronizing circuit shown in FIG. 13(a), while FIG. 13(c) denotes its timing chart.

In FIG. 13(b), if intervals of the read-out data have exceeded the predetermined number of the bytes, it is detected by counter 1935 which uses the phase-synchronized clock pulse, and the output of the counter 1935 is latched by the flip flop 1936.

The read instruction signal is negated by the data dropout detection signal or VFO reset signal, and the data for comparison to be input into the phase-synchronizing circuit is changed from the read-out data to the write clock pulse. This ensures error-free operation of the phase-synchronizing circuit despite data dropout due to recording medium defects.

As stated above, the phase pull-in operation fails in the high-speed pull-in mode if there is any recording medium defect or data dropout, and this will lead to a failure of phase follow-up operation in the subsequent process. Reproduction is retried if the data cannot be read out due to the presence of a recording medium defect or data dropout in the pull-in area.

In the retrial of reproduction, according to still another embodiment of the recording and reproducing apparatus under the present invention, the data is directly reproduced in the normal gain mode (phase follow mode), without making the mode changing signal active or without gaining the high gain mode in the pull-in area. Correct read-out of the data is made possible by retrying the reproduction in the pull-in area in such a way that the data is directly reproduced in the normal gain mode (phase follow mode). Furthermore, when reproduction is retried in the pull-in area in such a way that the data is directly reproduced in the normal gain mode (phase follow mode), it is preferable to set the attenuation factor $\xi$ of the phase-synchronizing circuit at a greater value than that in the normal phase follow mode. By doing so, the phase of the phase-synchronizing circuit can be quickly synchronized with the readout data phase.

Figure 14:
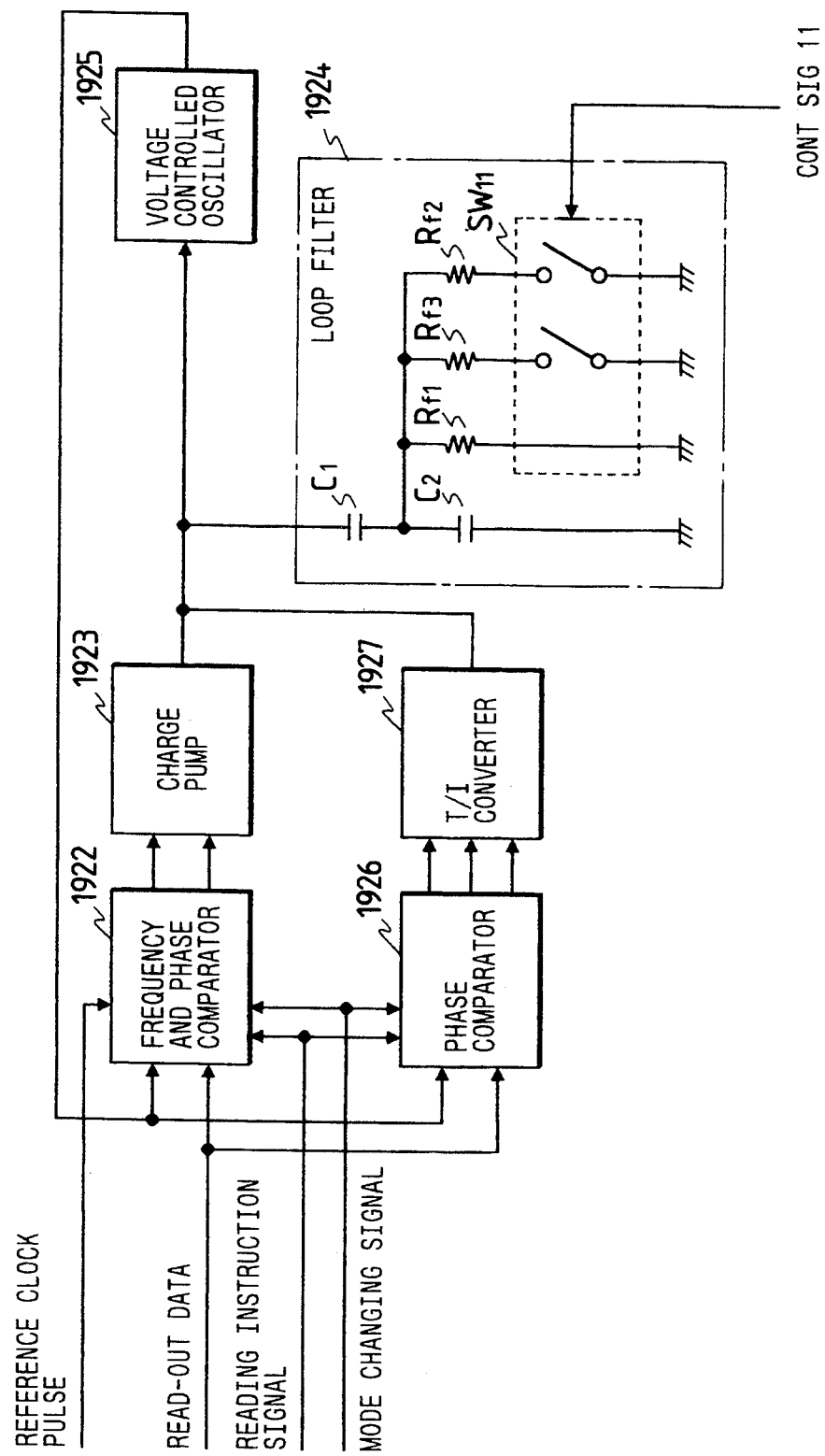
FIG. 14 is a block diagram showing the phase synchronizing circuit in the fourth embodiment of the present invention.

FIG. 14 is a block diagram for the phase-synchronizing circuit in such embodiment. In the phase-synchronizing circuit, attenuation factor $\xi$ is changed in three different ways by switch SW11 which is controlled by control signal 11.

The following formula show attenuation factors $\xi$ in each mode:

Attenuation factor $\xi H$ for high-speed pull-in operation (in high gain mode)

$$\zeta H = \frac{(C1 + C2)}{2} \cdot \frac{Rf1 \cdot Rf2}{Rf1 + Rf2} \cdot \omega nH$$

Attenuation factor $\xi N1$ in the normal phase follow mode (first normal gain mode):

$$\zeta N1 = \frac{(C1 + C2)}{2} \cdot Rf1 \cdot \omega nN$$

Attenuation factor $\xi N2$ in the phase follow mode in retrial (second normal gain mode):

$$\zeta N2 = \frac{(C1 + C2)}{2} \cdot \frac{Rf1 \cdot Rf3}{Rf1 + Rf3} \cdot \omega nH$$

As shown in FIG. 14, at the time of retrial, switch SW11 is operated by control signal 1 in such a way that resistor Rf3 is connected to resistor Rf1 in parallel. Then attenuation factor $\xi N1$ is set at a lower value than the attenuation factor $\xi N1$.

Reproduction is also retried when any read-out error has occurred to the reading medium defect or data dropout in the follow area. In said retrial of reproduction, the high-speed pull-in operation is first performed in the high gain mode according to the normal sequence. Then attenuation factor $\xi N2$ with greater value is used in the normal gain mode thereafter. Reproduction with attenuation factor $\xi N2$ ensures normal data read-out.

We claim:

1. A recording and reproducing apparatus comprising:

driving means for rotating a recording medium;

recording means for recording information on the recording medium rotated;

reproducing means for reproducing the information from the recording medium rotated, said reproducing means retrying reproduction of information from an area in the recording medium where an error has occurred to the data reproduced, in cases where the error has occurred to the data reproduced in the reproduction of information from the recording medium and said reproducing means is provided with a waveform shaping circuit and a phase-synchronizing circuit; and characteristic changing means for changing a characteristic of said reproducing means, said characteristic changing means changing at least one of an equalizer characteristic, a filter characteristic, a differentiator characteristic and a slice level, in said waveform shaping circuit;

wherein, if an error has occurred to the reproduced data in the reproduction of information from the recording medium, the reproducing characteristic of said reproducing means is changed by said characteristic changing means so that said reproducing means retries the reproduction of information from the area in the recording medium where the error has occurred to the reproduced data, under the changed reproducing characteristic.

2. An apparatus according to claim 1 wherein, if error-free information has been reproduced by said retrial of reproduction, said recording means records information to prohibit access of said reproducing means in said area of said recording medium where the error has occurred in the first reproduction, and at the same time, records the correct information reproduced by said retrial of reproduction in a different area of said recording medium.

3. A recording and reproducing apparatus comprising:

driving means for rotating a recording medium;

recording means for recording information on the recording medium rotated;

reproducing means for reproducing the information from the recording medium rotated, said reproducing means retrying reproduction of information from an area in the recording medium where an error has occurred to the data reproduced, in cases where the error has occurred to the data reproduced in the reproduction of information from the recording medium and said reproducing means is provided with a waveform shaping circuit and a phase-synchronizing circuit; and characteristic changing means for changing a characteristic of said reproducing means, said characteristic changing means changing at least one of a center frequency and a loop characteristic in said phase-synchronizing circuit;

wherein, if an error has occurred to the reproduced data in the reproduction of information from the recording medium, the reproducing characteristic of said reproducing means is changed by said characteristic changing means so that said reproducing means retries the reproduction of information from the area in the recording medium where the error has occurred to the reproduced data, under the changed reproducing characteristic.

4. An apparatus according to claim 3 wherein, if error-free information has been reproduced by the retrial of reproduction, said recording means records information to prohibit access of said reproducing means in said area of said recording medium where the error has occurred in the first reproduction, and at the same time, records the correct information reproduced by said retrial of reproduction in a different area of said recording medium.

5. A recording and reproducing apparatus comprising:

driving means for rotating a recording medium;

recording means for recording information on the recording medium rotated;

reproducing means for reproducing the information from the recording medium rotated, said reproducing means retrying reproduction of information from an area in the recording medium where an error has occurred to the data reproduced, in cases where the error has occurred to the data reproduced in the reproduction of information from the recording medium and said reproducing means is provided with a waveform shaping circuit and a phase-synchronizing circuit; and characteristic changing means for changing a characteristic of said reproducing means, said characteristic changing means changing at least one of an equalizer characteristic, a filter characteristic, a differentiator characteristic and a slice level in said waveform shaping circuit, and at least one of a center frequency and a loop characteristic in said phase-synchronizing circuit;

wherein, if an error has occurred to the reproduced data in the reproduction of information from the recording medium, the reproducing characteristic of said reproducing means is changed by said characteristic changing means so that said reproducing means retries the reproduction of information from the area in the recording medium where the error has occurred to the reproduced data, under the changed reproducing characteristic.

6. A recording and reproducing apparatus comprising:

driving means for rotating a recording medium, recording means for recording information on the recording medium rotated, reproducing means for reproducing the information from the recording medium rotated, said reproducing means retrying reproduction of information from an area in the recording medium where an error has occurred to the data reproduced, in cases where the error has occurred to the data reproduced of reproduction of information from the recording medium;

revolving speed changing means for changing a revolving speed of the recording medium; and characteristic changing means to change a reproducing characteristic of said reproducing means, wherein, if an error has occurred to the reproduced data in the reproduction of information from the recording medium, the revolving speed in the reproduction from the recording medium is changed by said revolving speed changing means to be smaller than that in recording so that said reproducing means retries to reproduce the information in the area where the error has occurred to the reproduced data, from the recording medium which is made to revolve at a lower speed than in recording.

7. An apparatus according to claim 6 wherein the reproducing characteristic of said reproducing means is changed by said characteristic changing means in conformity to the change of the frequency of the reproduced data which is caused by the fact that the revolving speed of the recording medium in the retrial of the reproduction is lower than that in recording.

8. An apparatus according to claim 7 wherein said reproducing means is provided with a waveform shaping circuit and a phase-synchronizing circuit, and said characteristic changing means changes at least one of an equalizer characteristic, a filter characteristic, a differentiator characteristic and a slice level in said waveform shaping circuit.

9. An apparatus according to claim 7 wherein said reproducing means is provided with a waveform shaping circuit and a phase-synchronizing circuit, and said characteristic changing means changes at least one of a center frequency and a loop characteristic in said phase-synchronizing circuit.

10. An apparatus according to claim 7 wherein said reproducing means is provided with a waveform shaping circuit and a phase-synchronizing circuit, and said characteristic changing means changes at least one of an equalizer characteristic, a filter characteristic, a differentiator characteristic and a slice level in said waveform shaping circuit, and at least one of a center frequency and a loop characteristic in said phase-synchronizing circuit.

11. An apparatus according to claim 6 wherein, if error-free information has been reproduced by said retrial of reproduction, said recording means records information to prohibit access of said reproducing means in said area of said recording medium where the error has occurred in the first reproduction, and at the same time, records the correct information reproduced by said retrial of reproduction on a different area of said recording medium.

* * * * *